Feb. 27, 1962 C. R. McCLOY 3,022,777
AUTOMOTIVE SPEED CONTROL MEANS
Original Filed Jan. 11, 1956 3 Sheets-Sheet 1
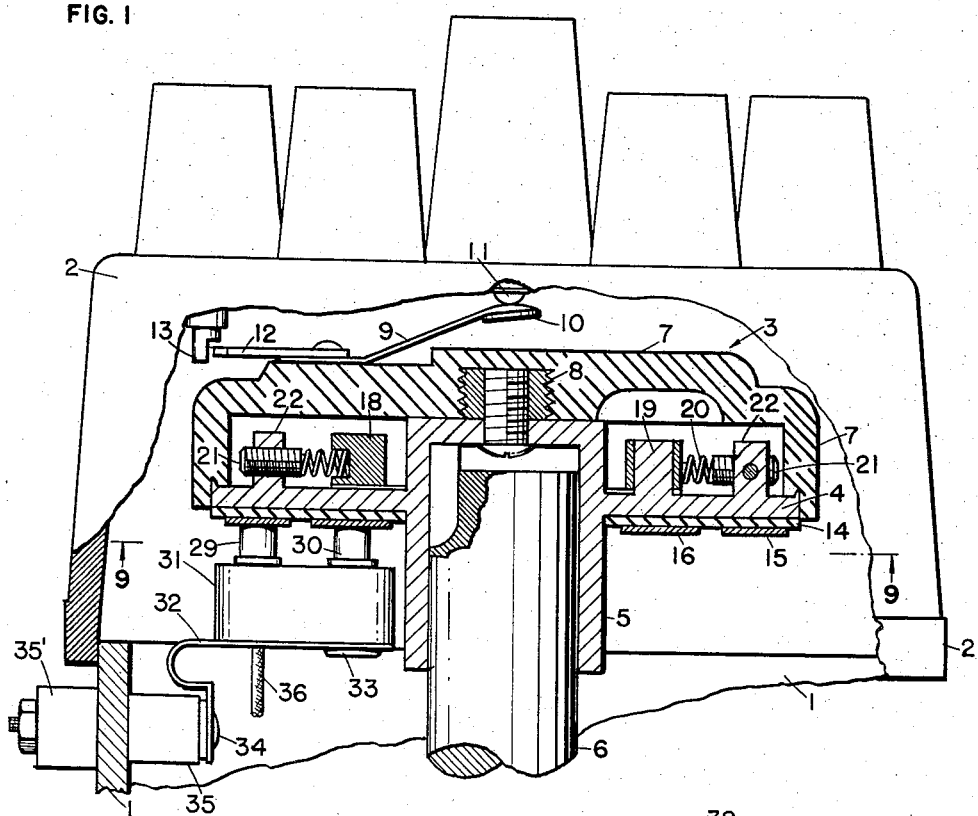
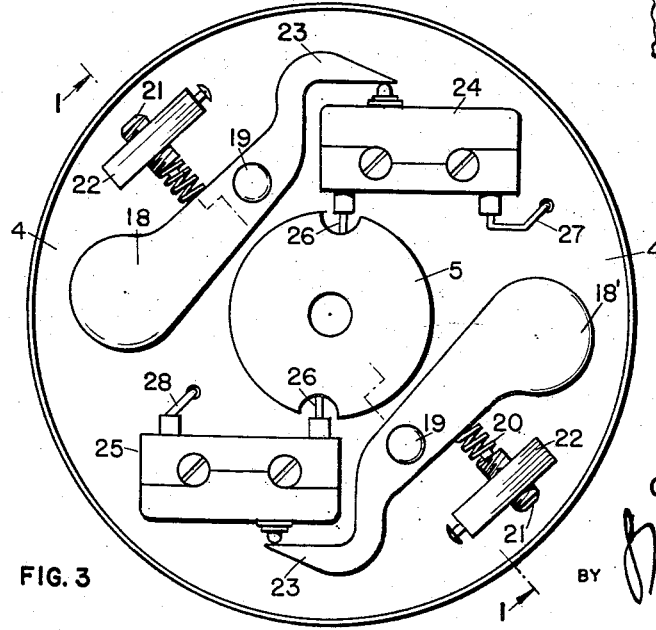
INVENTOR
CLARK R. McCLOY
BY
ATTORNEY Feb. 27, 1962          C. R. McCLOY          3,022,777
AUTOMOTIVE SPEED CONTROL MEANS
Original Filed Jan. 11, 1956          3 Sheets-Sheet 2
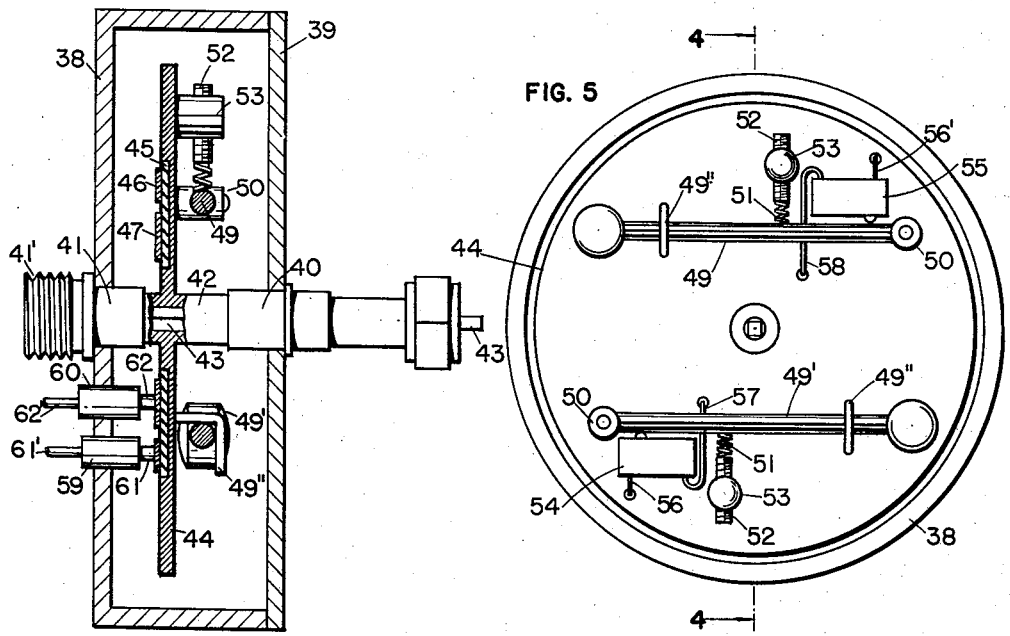
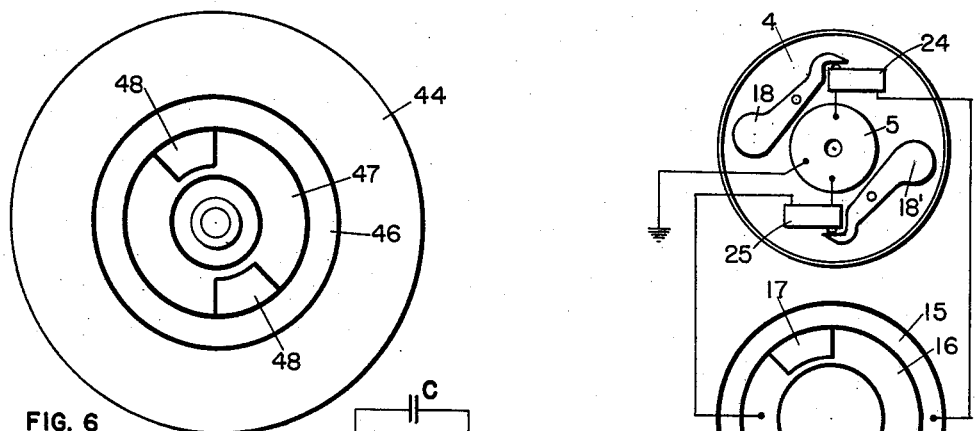
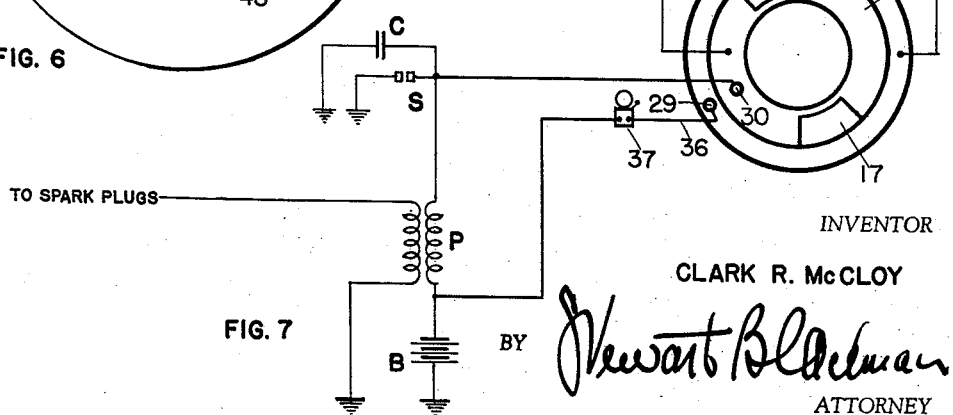
INVENTOR
CLARK R. McCLOY
BY Stewart Blackman
ATTORNEY Feb. 27, 1962      C. R. McCLOY      3,022,777
AUTOMOTIVE SPEED CONTROL MEANS
Original Filed Jan. 11, 1956      3 Sheets-Sheet 3
FIG. 8
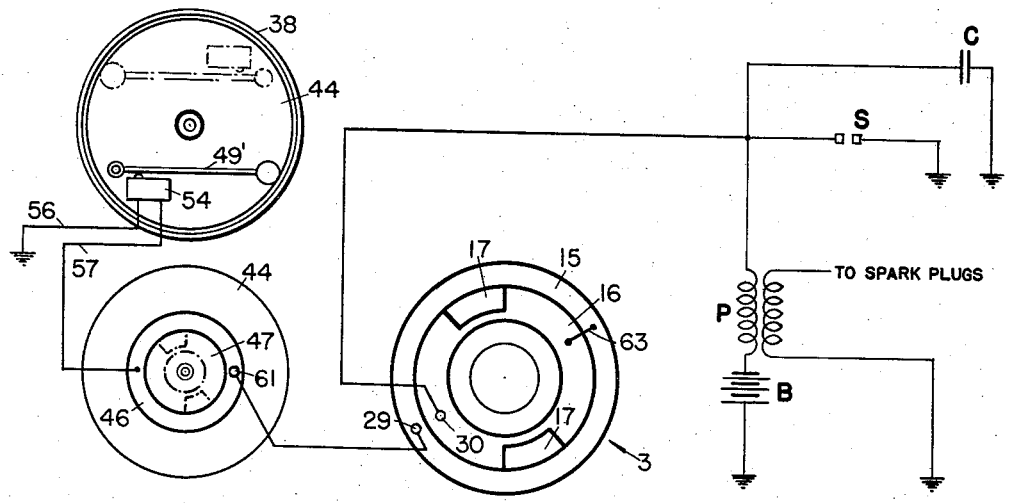
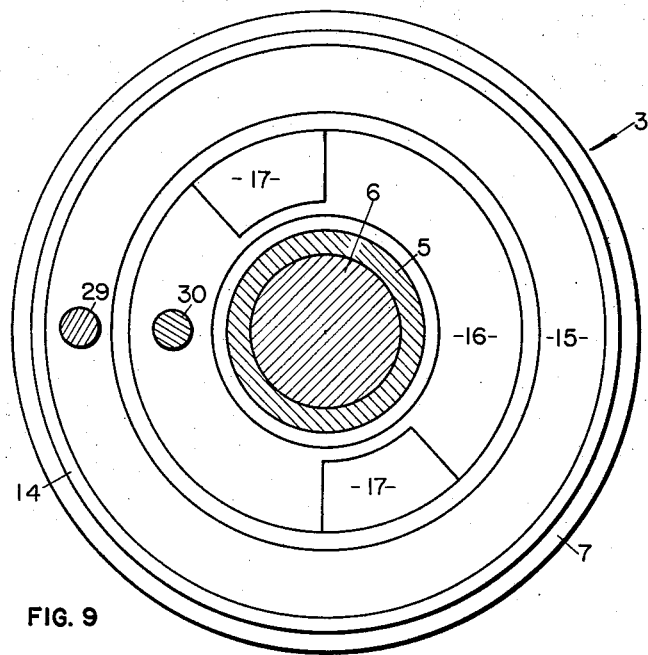
FIG. 9
INVENTOR
CLARK R. McCLOY
BY
ATTORNEY

United States Patent Office 3,022,777
Patented Feb. 27, 1962

3,022,777
AUTOMOTIVE SPEED CONTROL MEANS
Clark R. McCloy, 7800 NE. 4th Court, Miami 38, Fla.
Original application Jan. 11, 1956, Ser. No. 558,572, now Patent No. 2,851,555, dated Sept. 9, 1958. Divided and this application Aug. 2, 1957, Ser. No. 675,896
11 Claims. (Cl. 123—118)

This invention relates to speed control means for motor vehicles propelled by internal combustion engines and, more particularly, to an ignition system therefor, described in my co-pending application Serial No. 558,572, filed January 11, 1956, of which this is a divisional application. Application Serial No. 558,572 has now matured into Patent No. 2,851,555, issued September 9, 1958.

Prior speed controls of which I am aware, and especially governors affecting ignition systems, have usually functioned on the principle of killing the ignition to disable the engine. Such devices labor, in an actual practice, under the disadvantage that disabling the engine often leaves the vehicle without the residual power to continue its propulsion at the reduced speed with reasonably effective performance characteristics, under load.

This invention has for one of its objects to provide speed control means for multi-cylindrical internal combustion engines, responsive to either predetermined engine or vehicular road speeds, yet capable of permitting the continued travel of the vehicle at the reduced speed in relatively smooth and efficient operation.

The invention is embodied in speed control apparatus exemplified in the accompanying drawings in which the views are as follows, like reference characters designating identical parts throughout the several views:

FIG. 1, a fractional sectional elevation through the distributor, on line 1—1, FIG. 3;

FIG. 2, a bottom view of the brush holder;

FIG. 3, a plan of the distributor rotor with the cover removed;

FIG. 4, a section on line 4—4, FIG. 5;

FIG. 5, a plan of a speedometer driven rotor with the cover removed; and

FIG. 6, the commutator ring face thereof;

FIG. 7, a schematic diagram of a circuit in the distributor driven control means; and FIG. 8, a schematic diagram of one of the operable circuits for the speedometer driven means;

FIG. 9, a section on line 9—9, of FIG. 1.

A distributor assembly shown in part in FIGS. 1 and 3, includes a casing 1 on which is detachably mounted the usual cap 2 having arranged therein a rotor shown, generally, at 3. This rotor has a circular base plate 4 at the centre of which is formed an open-bottom hub 5. Received within this hub, is the top end portion of a distributor shaft 6 to which the plate structure 4 is attached for rotation therewith. Surmounting the plate 4, is a removable dielectric cover 7, attached as by threadable fastenings 8 to the top of the hub structure 5.

The cover carries the usual "serpent's tongue" 9 terminating at its inner end in a contact 10 biased into electrical engagement with a complementary contact 11 communicating with a high tension voltage source (not shown), and at its outer end in a wiper arm 12. This arm functions in well known operative relation with an array of circumferentially alined terminals 13 by which a circuit from the spark coil to the spark plugs in a conventional automotive ignition system is completed.

Against the bottom face of the base plate 4 is formed a dielectric membrane 14, of which the exposed face bears a pair or commutator rings 15 and 16 (FIG. 9), concentric with the axis of the shaft 6 and, preferably, printed. Interposed in the ring 16, is a pair of diametrically opposed segments 17 electrically isolated therefrom and spaced from the inner periphery thereof to preserve electrical conductivity therethrough.

The plate 4 has arranged thereon a pair of governor weights 18 and 18', fulcrumed at 19, and retractable by helical springs 20 bearing at one end against the governor weights and at the opposite end against a corresponding pair of adjusting screws 21 threadable in brackets 22 formed on the plate 4. By this construction, tension in the springs 20 may be adjusted in a manner known in the art whereby to predetermine the rotational speed of the governor weights at which they will pivot in response to centrifugal force developed in the rotor 3.

At their unweighted ends, the governor weights terminate in fingers 23 engageable with the operating push buttons of a pair of normally open snap switches 24 and 25, the independent closing of which is effected upon the inward movement of the fingers 23 when the governor weights pivot in response to centrifugal force developed at predetermined rotational speeds of the rotor 3. One contact in each switch is connected through a lead 26 with grounding means through the hub 5 and distributor shaft 6. The corresponding opposite contacts communicate, from switch 24 through a lead 27 with the commutator ring 15, and from switch 25 through a lead 28 with commutator ring 16. Thus, the governor weights 18 and 18' are pivotable as hereinabove described to effect the grounding, respectively, of rings 15 and 16. The term "snap," as applied to switches 24 and 25 in the specification and claims, is intended to refer to switches which are spring-urged to open position but closable by a very light closing pressure applied thereto.

In electrical wiping contact with rings 15 and 16, respectively, is a pair of brushes 29 and 30 carried in a brush holder 31, the internal mechanisms of which (not shown) effect the resilient engagement of their respective rings by the brushes, in a manner known in the art. The brush holder is supported by the horizontal arm of a bracket spring 32 of electrical conductor material, there being a fastener 33 of like material securing the holder to the bracket and communicating electrically with the brush 30. The bracket 32 is fastened, as at 34, to the primary terminal on the casing, passing through terminal blocks 35 and 35'. An insulated flexible conductor 36, connected to the brush 29, passes through an aperture 36' (FIG. 2), formed in the bracket.

Referring now to the diagram in FIG. 7, a conventional circuit for an ignition system including a battery B, condenser C, spark coil P, and breaker points S, is illustrated with the principles of the invention applied thereto. It will be seen that governor weight 18', responding to the predetermined speed of rotor 3, establishes a circuit grounding ring 16, brush 30, bracket 32, terminal 34, and breaker points S, during the arcs of the rotor's rotation when brush 30 is in contact with ring 16. When the brush 30 is in contact with segment 17, the grounding circuit to the breaker points will be interrupted, permitting the flow of electricity thereto. By relating the degree of arc subtended by segments 17 to the firing order of the engine, all but two of the spark plugs will be grounded out on reaching the predetermined control speed, thereby rendering inoperative the remaining spark plugs but permitting the engine to continue in operation on the two functioning cylinders excluded by segments 17 from the grounded circuit hereinabove described.

By connecting the conductor 36, from brush 29, to a suitable signal 37 and completing the operative circuit thereto shown from the battery B, the governor weight 18 may be used to ground ring 15 for the purpose of warning the operator of the vehicle of its impending critical speed.

As is clearly apparent from the wiring diagram in FIG. 7, the electric circuit for signal device 37, controlled by snap switch 24 and its governor weight 18, is functionally separate and independent of the spark plug grounding circuit, including the primary winding of spark coil P, that is actuated by snap switch 25 under the control of its governor weight 18' since the electric circuit conductor for signal 37 is connected to battery B at a point intermediate the battery and spark coil. However, the mechanical components for controlling these two electrical circuits are structurally inter-related, as shown, as evidenced by the disposition of governor weights 18, 18' and snap switches 24, 25, respectively, relative to each other on the rotor 3 and the common electrical connection to the battery B for the two circuits. As is also likewise apparent from the disclosure, the provision of an adjusting screw 21 for each governor spring 20 enables the control of each of the two electrical circuits to be separately adjusted. Thus, in order that the operator of the vehicle be warned of the impending spark plug shorting critical vehicle speed, the spring for the governor 18 is preferably adjusted so as to cause the snap switch 24 for signal 37 to be actuated in advance of, or at a somewhat lower speed of, distributor shaft 6, than is snap switch 25.

The invention is thus seen to provide a positive speed control means operable at a predetermined engine speed as translated by the distributor rotor, yet providing adequate residual power available for climbing hills and pulling loads.

Furthermore, the commutator ring 16 and its segments 17 constitute a novel interruptible rotatable conductor which may be connected to one side of a centrifugal switch, the other side of which communicates with ground conductor means, the rotatable conductor communicating with an ignition system whereby to intermittently interrupt the flow of electricity thereto so as to correspondingly interrupt the operation of an internal combustion engine upon the closing of the switch.

A modification of the invention is to provide speed control means responsive to the vehicular or road speed is depicted in FIGS. 4, 5, and 6. This form of the apparatus has a cylindrical casing 38 and a detachable cover 39 secured in any suitable manner (not shown) thereto. A pair of axial bushings 40 and 41 are seated in opposing walls of the casing, bushing 40 being fitted with coupling means for attachment to a speedometer or cable therefor, and bushing 41 terminating exteriorly of the casing for operative association with a speedometer cable or, as at 41', transmission. Arranged for rotation in these bushings is a hub 42 driveable by an axial shaft 43 passed therethrough and through the casing and the bushings, projecting from the coupling means associated with bushing 40 for operative connection with corresponding elements of a speedometer drive cable or speedometer.

Formed integrally with the hub 42, is a circular disc 44 in one face of which is imbedded a dielectric membrane 45, annular in shape. This membrane has imprinted against its exposed face (FIG. 6), a pair of commutator rings 46 and 47 in concentric relation with the axis of the hub 42. A pair of diametrically opposed segments 48, electrically isolated from ring 47 is interposed therein and spaced from the inner periphery thereof to preserve electrical conductivity through ring 47.

Arranged on the opposite face of the disc 44, is a pair of governor weights 49 and 49', guided for pivotal travel by overlying, L-shaped brackets 49". The governor weights are each pivoted at one end thereof, as at 50, and are retractible by corresponding helical springs 51, the tension of which is adjustable in conventional manner by shafts 52 threadable in supporting brackets 53 carried by the disc 44.

A pair of normally open snap switches 54 and 55 is positioned in operative relation to the governor weights, respectively, 49' and 49 so as to be closeable thereby as will be readily understood from the earlier description of the distributor driven rotor structure set forth above. A contact from each switch is connected as by leads 56 and 56' to ground through disc 44 and the casing. The opposing contacts in these switches are connected, from switch 54 through lead 57 to the outer ring 46, and from switch 55 through lead 58 to the inner ring 47. A pair of brush holders 59 and 60 are seated in the base of the casing 38, and a corresponding pair of brushes 61 and 62 engage, respectively, rings 46 and 47 in electrical wiping contact therewith. Flexible insulated conductors 61' and 62' extend from brushes 61 and 62, and the operation of the speedometer driven assembly herein described will be readily apparent to those skilled in the art from the earlier description of the distributor driven structure hereinabove set forth, an example of one such application of the principles of the invention being schematically illustrated by the diagram in FIG. 8. One of the governor weights, 49', and its associated snap switch 54, may be utilized as shown in the diagram, the other governor weight and switch, in this instance, being rendered inoperative in any convenient manner. Commutator ring 46 is connected by a cable including conductor 61' to the corresponding outer ring 15 of the distributor rotor 3. A tie member 63 connects rings 15 and 16, thus grounding ring 16 when the speedometer driven disc 44 reaches a predetermined speed and governor weight 49' pivots in consequence to close switch 54. Brush 30, for example, will then function to ground out all cylinders except those which receive the spark inducing voltage when this brush is in contact with segments 17, as hereinabove explained.

Of course, the invention is susceptible to various minor changes without departing from the scope thereof as hereinafter claimed, it being understood that the interruptor segments serve to exclude some of the spark plugs from the grounding circuit established by the centrifugally-operated snap switches and that a single segment may suffice for engines, for example, of four cylinder construction, or having a lesser number of spark plugs in its ignition system.

I claim:

1. In speed control means for a multi-cylindered internal combustion engine including an ignition system having a speed sensitive switch, rotatable distributor means directing spark inducing circuits serving the cylinders of said engine, a commutator ring rotatable with said distributor means and an interruptor segment in said ring electrically isolated therefrom, the combination of a normally open grounding circuit closeable by said switch and communicating with said ring, conductor means electrically connecting said ring with said spark inducing circuits to effect intermittent interruption of said grounding circuit for the exclusion therefrom of some of the spark inducing circuits whereby to disfunction the cylinders served by the grounded spark inducing circuits but permit the continued operation of cylinders served by said excluded circuits.

2. In speed control means for a multi-cylindered internal combustion engine including an ignition ssytem having a speed responsive switch, rotatable distributor means directing spark inducing circuits serving the cylinders of said engine, a circular circuit path rotatable with said distributor means and an interruptor segment in said circuit path electrically isolated therefrom, the combination of a normally open grounding circuit closeable by said switch and communicating with said circuit path, conductor means electrically connecting the circuit path with the spark inducing circuits to effect intermittent interruptions in said grounding circuit and exclude therefrom some of the spark inducing circuits whereby to preserve in operation the cylinders served thereby but inactivate the cylinders served by the grounded spark inducing circuits.

3. In speed control means for a multi-cylindered internal combustion engine including an ignition system having a speed sensitive switch, a spark coil and rotatable distributor means directing cylinder firing circuits from said coil, a circular circuit path rotatable with said distributor means and an interruptor segment in said circuit path electrically isolated therefrom, the combination of a normally open grounding circuit closeable by said switch and communicating with said circuit path, a brush in electrical wiping contact with said circuit path and in electrical communication with said coil to effect intermittent grounding thereof for the corresponding grounding of some of said firing circuits whereby to disfunction the cylinders served by the grounded firing circuits but permit operation of the cylinders served by the ungrounded circuits.

4. In speed control means for a multi-cylindered internal combustion engine including an ignition system having a speed sensitive switch, a spark coil, and a distributor having a rotor directing cylinder firing circuits from said coil, a commutator ring carried by said rotor and rotatable therewith and an interruptor segment in said ring electrically isolated therefrom, the combination of a normally open grounding circuit closeable by said switch and communicating with said commutator ring, a brush in electrical wiping contact with said ring and electrically connected with said coil to effect intermittent grounding thereof for the corresponding grounding of some of said firing circuits whereby to disfunction the cylinders served thereby but permit the operation of the cylinders served by the ungrounded circuits.

5. In speed control means for a multi-cylindered internal combustion engine including an ignition system having a speed sensitive switch, a spark coil, and a distributor having a rotor directing cylinder firing circuits from said coil, interrupted circular conductor means carried by said rotor and rotatable therewith, the combination with a normally open grounding circuit closeable by said switch and communicating with the interrupted circular conductor means, of a brush in electrical wiping contact with said interrupted circular conductor means and electrically connected with said coil to effect the intermittent grounding thereof for the corresponding grounding of some of said firing circuits whereby to disfunction the cylinders served thereby but permit the operation of the cylinders served by the ungrounded firing circuits.

6. In an ignition system for supplying high voltage current to the spark plugs of a multi-cylindered internal combustion engine, said ignition system including a spark coil, a distributor housing, a rotor within said distributor housing mounted on a shaft rotated by the engine, said rotor directing spark plug firing circuits from said spark coil, normally open speed responsive snap switch means fixedly mounted on said shaft rotated by the engine, commutator ring means rigidly secured on said rotor to rotate therewith and having at least one non-conducting arcuate segment therein, said speed responsive snap switch means and commutator ring means being electrically connected in open grounding circuit with said spark coil, said switch means closing said grounding circuit therethrough at a predetermined speed of said rotor to ground and render inoperative most of said spark plug firing circuits, said commutator non-conducting arcuate segment functioning while said switch means is closed to maintain the remainder of said spark plug firing circuits operative.

7. The system as defined in claim 6, wherein said ring means comprises two concentric ring members, said commutator non-conductor segment being disposed in one of said ring members, said electrical connection including a first stationarily mounted brush means in said distributor housing engaging said one of said commutator ring members, a second stationarily mounted brush means in said distributor housing engaging the other of said commutator ring members, a second speed responsive snap switch means mounted on said shaft rotated by the engine, means to indicate a speed of rotation of said shaft, said second speed responsive snap switch means and the other of said commutator ring means being electrically connected in open grounding circuit with said speed indicating means, a speed responsive means mounted on said shaft and responsive at said predetermined speed of said shaft to effect said closing of said grounding circuit through said spark coil, a second speed responsive means mounted on said shaft and responsive to a predetermined lower speed of said shaft to effect a closing of said grounding circuit through said second speed responsive snap switch means and said speed indicating means.

8. The system as defined in claim 7, wherein said two speed responsive means each include adjustable means therein whereby they can be adjusted to actuate the snap switches associated therewith at any desired predetermined shaft speeds.

9. In a speed control for a multi-cylindered internal combustion engine, including an ignition system including a spark coil, a distributor, a rotor in said distributor, said rotor mounted on a shaft driven by the engine and directing spark plug firing circuits from said spark coil, commutator ring means fixed on said rotor to rotate therewith and having at least one electrically isolated arcuate segment therein, a normally open speed responsive switch responsive to the speed of said shaft driven by the engine, said switch closing when said shaft exceeds a predetermined speed, said switch being electrically connected in open grounding circuit with said spark coil through said commutator ring means, said switch when closed grounding a plurality of said spark plug firing circuits, said commutator electrically isolated arcuate segment functioning while said switch is closed to maintain the remainder of said spark plug firing circuits operative.

10. A speed control means for a multi-cylindered internal combustion engine comprising an ignition system, said system including a spark distributor casing having spark plug circuits connected thereto, rotor means mounted in said casing, commutator ring means rigidly mounted on said rotor to rotate therewith, a spark coil adapted for supplying high tension current to the cylinders of the engine, said rotor directing high tension current from said coil to said spark plug circuits, a speed responsive snap switch fixedly mounted on said rotor and connected to the primary winding of said spark coil and operative at a predetermined rotor speed to connect said primary winding to ground through said commutator ring means, said switch being fixed on and rotatable with said rotor, said commutator ring means including an electrically isolated segment portion effective to interrupt the grounding of the primary circuit of said spark coil through a predetermined arc of movement of said rotor during each revolution thereof while said speed responsive snap switch is closed to maintain the flow of high tension current in certain of said spark plug circuits while the remainder thereof are rendered inoperative.

11. In a speed control system for a multi-cylindered internal combustion engine, said control system comprising a distributor housing, a rotor mounted in said distributor housing, a speed responsive snap switch fixedly mounted on said rotor and driven by the internal combustion engine, a spark coil, said rotor controlling spark plug firing circuits from said spark coil, a commutator ring fixed on and rotatable with said rotor, an interruptor arcuate segment in said commutator ring electrically isolated therefrom, a normally open grounding circuit including the primary winding of said spark coil, said circuit being closable by said speed responsive snap switch when said rotor exceeds a predetermined speed, thereby grounding and rendering most of said spark plug firing circuits inoperative, said commutator electrically isolated arcuate segment functioning, while said snap switch is closed, to maintain the remainder of said spark plug firing circuits operative.

References Cited in the file of this patent

UNITED STATES PATENTS

| | | |
|---|---|---|
| 970,794 | Carlson | Sept. 20, 1910 |
| 1,470,277 | Loftus | Oct. 9, 1923 |
| 1,925,883 | Smith | Sept. 5, 1933 |

FOREIGN PATENTS

| | | |
|---|---|---|
| 711,115 | France | June 23, 1931 |